(12) United States Patent
Harris et al.

(10) Patent No.: US 6,721,683 B2
(45) Date of Patent: Apr. 13, 2004

(54) PUMP SYSTEM DIAGNOSIS

(75) Inventors: Casey A. Harris, Inkom, ID (US);
Jeffrey A. Schibonski, Idaho Falls, ID (US); Frederick E. Templeton, Salmon, ID (US); Dal L. Wheeler, Pocatello, ID (US)

(73) Assignee: Insightek, LLC, Salmon, ID (US)

( * ) Notice: Subject to any disclaimer, the term of this patent is extended or adjusted under 35 U.S.C. 154(b) by 92 days.

(21) Appl. No.: 10/093,665

(22) Filed: Mar. 8, 2002

(65) Prior Publication Data

US 2003/0171895 A1 Sep. 11, 2003

(51) Int. Cl.⁷ ................................................. G06F 9/00
(52) U.S. Cl. ...................... 702/183; 702/100; 702/104; 702/142
(58) Field of Search ............................ 702/51, 57, 58, 702/64, 65, 96, 98, 100, 104, 142, 183; 600/438; 417/53; 123/435; 310/168

(56) References Cited

U.S. PATENT DOCUMENTS

| | | | | |
|---|---|---|---|---|
| 6,035,265 A | * | 3/2000 | Dister et al. | |
| 6,178,393 B1 | * | 1/2001 | Irvin | 703/10 |
| 6,260,004 B1 | * | 7/2001 | Hays et al. | 702/183 |
| 6,261,065 B1 | * | 7/2001 | Nayak et al. | 417/53 |
| 6,308,787 B1 | * | 10/2001 | Alft | 175/48 |
| 6,532,392 B1 | * | 3/2003 | Eryurek et al. | 700/54 |

\* cited by examiner

Primary Examiner—Marc S. Hoff
Assistant Examiner—Felix Suarez
(74) Attorney, Agent, or Firm—Ormiston & McKinney, PLLC (57) ABSTRACT

A low cost method and system for diagnosing and reporting potential pump system failure. A method embodying the invention includes calculating amperage variables for the pump moter using a signal from an amp sensor measuring electrical current used by the pump. Design values for the pump are acquired and diagnostic values are calculated using one or more calculated amperage variables and one or more of the acquired design values. Using the diagnostic values, diagnostic parameters are then calculated. Each design parameter is then compared with a baseline value or pattern. Where the design parameter verifies beyond a set tolerence limit, an adverse diagnosis is reported.

26 Claims, 5 Drawing Sheets

| DIAGNOSTIC FUNCTION | SEC | INDEX |
|---|---|---|
| LOGICAL EXPRESSION (1) | N(1) | 1 |
| LOGICAL EXPRESSION (2) | N(2) | 2 |
| ⋮ | ⋮ | ⋮ |
| LOGICAL EXPRESSION (n) | N(n) | n |

PUMP SYSTEM DIAGNOSIS

FIELD OF THE INVENTION

The present invention relates to diagnosing failures and potential failures in electric motor driven systems and more particularly in electric motor driven pumping systems such as wastewater lift stations.

BACKGROUND OF THE INVENTION

Wastewater lift stations (WWLS) are found in virtually all sewer systems. They serve to lift wastewater from low elevations along the sewer line to higher elevations so as to maintain a continuous down-slope grade to the receiving wastewater treatment facility. Failure of a WWLS can result in substantial environmental damage, and/or property damage when wastewater is discharged from the sewer line or floods residential or commercial drains. To avoid such events, sewer system operators employ various methods of monitoring WWLS's to detect component failures or degradation so that maintenance action can be taken before damage occurs.

One method commonly used is to conduct periodic manual inspections. The inspection period can range from one or more inspections per day to weekly inspections. In any case, manual inspections involve travel to each WWLS, and since most WWLS's are constructed below the ground surface, special precautions must be observed to safely enter the station. A common problem with intermittent manual inspections is that they fail to diagnose signs of failure that may appear between inspections, and they often lack sensing devices that can detect failure symptoms before they can be observed manually. Furthermore, by the time a failure symptom can be observed manually, significant damage to the station may have occurred.

Another method is to install an automated monitoring or control system designed to detect and report failures of station components early enough to allow corrective actions that may prevent or minimize damage. For example, as disclosed by Irwin (U.S. Pat. No. 6,178,393 B1) a drop in pump efficiency, as determined by the energy use compared to its output, may indicate a problem with a pump, thus triggering a preventative action prior to a catastrophic failure. Another measure of efficiency in common use is the wire-to-water efficiency as an indicator of the health of the pumping system.

A critical factor in the diagnosis of pumping systems is the cost of the diagnostic system. To justify the installation of a diagnostic system, the savings over the life of the system must substantially exceed its cost. Savings accrue in proportion to failure rates and the economic consequences of a failure. Failures can be classified in a range of events from a slight degradation of performance to a complete breakdown of pumping function. Most pumping systems employ a means of detecting complete breakdowns, but small degradations may go undetected for long periods of time before being discovered. Nevertheless, small degradations over a long period can add up to large costs. Also, degradations of a certain type can quickly grow to a complete breakdown if not corrected promptly. Therefore another important consideration in the diagnosis of pumping systems is the identification of the kind of problem that is developing. For example, detection of an obstruction in the discharge or inlet pipe would demand more immediate attention than detection of a worn pump impeller. In the case of an obstruction, the maintenance crew can be dispatched with the tools needed to correct a plugged line, whereas, in the case of a worn pump impeller, the replacement operation can be scheduled far in advance with the proper replacement parts in hand before a maintenance crew is dispatched. To arrive at a site and discover a problem that requires tools or parts that are not immediately available adds costs and time to the repair operation. Alternatively, having to carry an inventory of expensive tools and parts to every maintenance event because of a lack of knowledge about the cause of problem that will be encountered is costly. Current, low cost, diagnostic systems fail to provide definitive information about the cause of failures.

Early detection is a very important aspect of pump system diagnostics. In general, other low cost systems only detect failures after they have reached a critical stage such as high water level alarms. Once the pump system has failed to the point that the pumps are no longer able to keep up with the inflow into the site, repair crews have a very limited amount of time to travel to the site and fix the problem before backups occur. Backups are instances where raw sewage pools in the sewer lines because of a failure in the collection system, generally an obstruction in the lines or a failed pump. If the backup persists long enough, the sewage will begin to collect in the basements of homes and other low spots. Backups commonly cause extensive damage to residential neighborhoods and commercial areas; damage that municipalities are responsible for repairing. Being able to detect partial blockages and failing pumps early on in the failure cycle can save repair crews tremendous amounts in both labor and liability costs. With early detection, there is sufficient time to correct even the most difficult problems or arrange for other means of handling the sewage before a backup can occur. Early detection can also allow wastewater operators more leeway in scheduling repairs during normal working hours rather than on an emergency basis.

So, the most advantageous diagnostic systems are those with the lowest cost and the highest problem resolution capability. The three major cost elements of remote diagnostic systems relate to sensors, communication methods, and processors. Sensor costs vary in proportion to the number and type of sensors used in the diagnostic system. For example, Irwin (U.S. Pat. No. 6,178,393 B1) employs a power sensor and a flow sensor to derive just two operating variables (i.e. energy and volume pumped). Others use various combinations of sensors including amperage sensors, flow sensors, pressure sensors, level sensors, vibration sensors, temperature sensors, etc. Current disclosures require multiple sensory inputs to accomplish detailed diagnoses and fail to describe methods of automatically calculating such diagnoses. Sensors are typically connected to a remote processor, which converts the sensor signals to digital data representing various pump system parameters. Such data is then transmitted through communication systems to another processor where it is analyzed manually and the resulting diagnostic reports are made available to operators.

Typical practice for high-end monitoring systems is to transmit a large volume of data from each remote pump system to a central location where pump system operators may derive a diagnosis from examination of historical values of such data. Automation of the diagnostic process can substantially reduce communication requirements and labor time required for analysis of the data. Communication costs vary in proportion to the frequency and volume of the data transmitted. Examples of communication methods used in remote diagnostic systems include dedicated telephone lines, cellular telephones, cellular radios, and packet radios.

Processor costs vary in proportion to the number and capability of the processors. Remote diagnostic systems employ at least one processor at each remote site and usually more than one processor at the central facility overseeing the installation or set of installations (i.e. the lift stations managed by one municipality). The widespread availability of the Internet can reduce central site processing costs by servicing very large numbers of remote sites with a single web site facility that can distribute diagnostic reports anytime, anywhere through the Internet. However, while use of the Internet in remote diagnostic applications provides a means of reducing the processing cost elements, automatic methods that reduce sensor, communication and labor costs and increase problem resolution capability of diagnostic systems are still needed in order to economically provide diagnostic system benefits to most pumping systems.

SUMMARY OF THE INVENTION

Accordingly, the present invention is directed to a method and system for diagnosing potential pump system failure. A method embodying the invention includes calculating amperage variables for the pump motor using a signal from an amp sensor measuring electrical current used by the pump. Design values for the pump are acquired and diagnostic values are calculated using one or more calculated amperage variables and one or more of the acquired design values. Using the diagnostic values, diagnostic parameters are then calculated. Each design parameter is then compared with a baseline value or pattern. Where the design parameter verifies beyond a set tolerance limit, an adverse diagnosis is reported.

DETAILED DESCRIPTION OF THE INVENTION

Introduction

Figure 1:
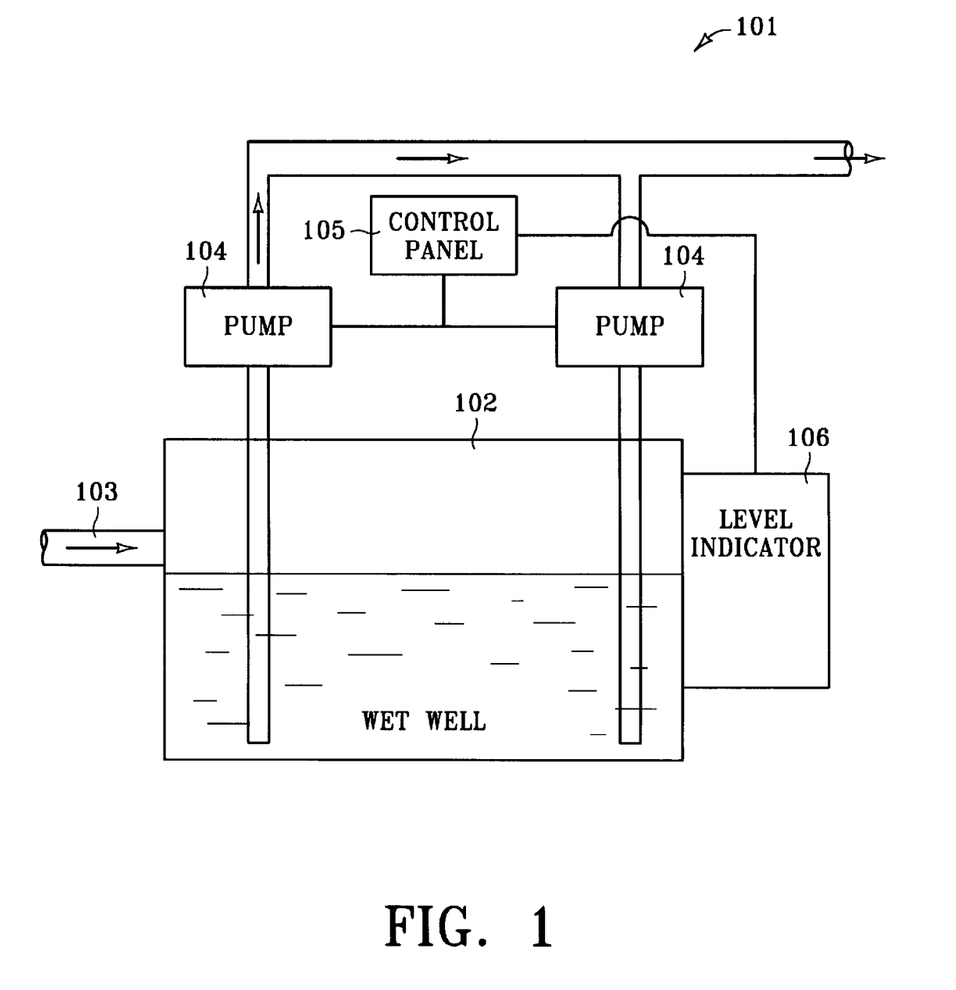
FIG. 1 is a schematic representation of a wastewater lift station in which various embodiments of the present invention may be incorporated.

FIG. 1 is a schematic representation of a wastewater lift station 101. Lift station 101 consists of a receiving reservoir or wet well 102, which is connected to one or more sewer pipes 103. Each sewer pipe 103 is connected to a multitude of sources, each of which discharge varying amounts of wastewater into the sewer pipe 103 at any time. One or more pumps 104, usually driven by an electric motor, serve to pump wastewater from the wet well to a subsequent lift station or wastewater treatment plant. A motor control panel 105 controls the operation of the pump motors. The motor control panel 105 receives signals from a level indicator 106 in the wet well 102, which indicates when the wastewater in the wet well has reached one of several different water levels important to the control process. The first is the off level. This is the level at which all pumps are off and the cistern is essentially drained; it is the lowest level measured in the wet well. The second level in a typical system is the lead level. When the signal from the level indicator 106 indicates the lead level has been reached, the motor control panel 105 starts one or more lead pumps 104. When the signal indicates the off level has been reached the motor control panel stops the pump or the pumps. Each time the motor control panel 105 starts a pump or pumps, it alternates between the pumps available in deciding which is the lead pump. This uses the pumps an equal amount of time and balances wear across all of the installed equipment. This is the normal operating cycle of the system, and it continues as long as wastewater is flowing into the wet well.

In the event that the inflow rate into the system is such that the first pump or pumps 104 are insufficient to drain the wet well 102, the motor control panel 105 will start a second pump or set of pumps 104. These are known as the lag pumps, and they are started when the water in the wet well 102 reaches the next highest, or lag level. At this point, the motor control panel 105 generally leaves both pumps or sets of pumps running until the water level in the wet well drops back to the off level.

Other configurations of wastewater lift stations include stations with pumps that run continuously but vary their pumping rate so as to match inflow from the sewer pipes. In such configurations, the pumps are controlled so as to maintain a constant level in the wet well or a constant pressure at the pump inlet. A failure of the lift station can result from a component failure or degradation, including, but not limited to, blockage of the incoming sewer pipe, blockage of the pipe between the wet well and pump, blockage of the pump discharge lines, loss of pump efficiency, failure of a motor, failure of the level indicator, failure of the motor control panel or power failure.

Components

Figure 2:
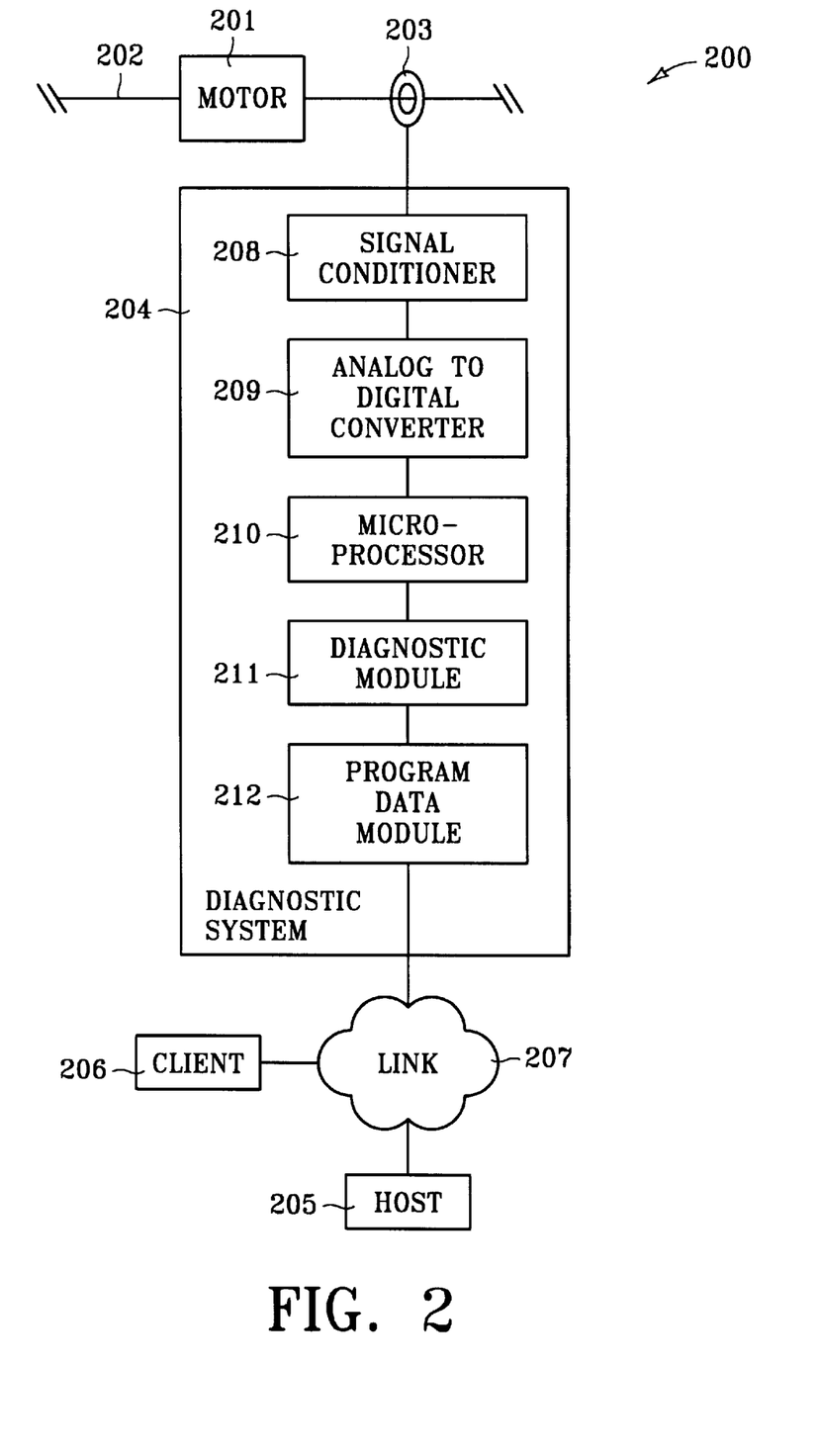
FIG. 2 is a block diagram of a diagnostic system according to an embodiment of the present invention.

FIG. 2 is a block diagram of a diagnostic environment 200. Environment 200 includes pump motor 201, power line 202 (supplying electricity), and amp sensor 203, preferably a Hall Effect current transducer. A Hall Effect current transducer is preferred because of its low cost and the fact that it is electrically isolated from the power line. Environment 200 also includes diagnostic system 204, host 205, and client 206. Diagnostic system 204 represents generally any combination of programming and/or hardware capable of calculating and providing diagnostic data for pump motor 201 using signals received from amp sensor 203. Host 205 represents generally any combination of programming and or hardware capable of providing a central repository for diagnostic data acquired from diagnostic system 204. Host 205 also has the capacity to perform any number of diagnostic processes including pattern matching and trend analysis on the acquired data and to raise and transmit alarms or other messages via link 207 to client 206. Client 206 represents generally any combination of programming and or hardware capable of displaying an interface enabling a user to interact with host 205. Diagnostic system 204, host 205, and client 206 are interconnected by link 207. Link 207 represents generally a cable, wireless, or remote connection via a telecommunication link, an infrared link, a radio frequency link, or any other connector or system that provides electronic communication between components 204–206. Link 207 may represent an intranet, an Internet, or a combination of both.

Diagnostic system 204 includes signal conditioner 208 for receiving signals from amp sensor 203. The output of the signal conditioner 208 is connected to an analog-to-digital converter 209, preferably an integrated circuit component of standard design that is capable of high-speed conversions. The output of the analog to digital converter 209 is connected to a microprocessor 210. The microprocessor 210 is preferably an integrated circuit of standard manufacture that is capable of executing diagnostic module 211, a computer program code written in a commonly available software language such as C, C++, or Assembly. A program data module 212 is also connected to microprocessor 210. The program data module 212 represents memory capable of storing data used by microprocessor 210 when executing diagnostic module 211. Preferably, the program data module is nonvolatile memory at least 1024 bytes in size.

Figure 3:
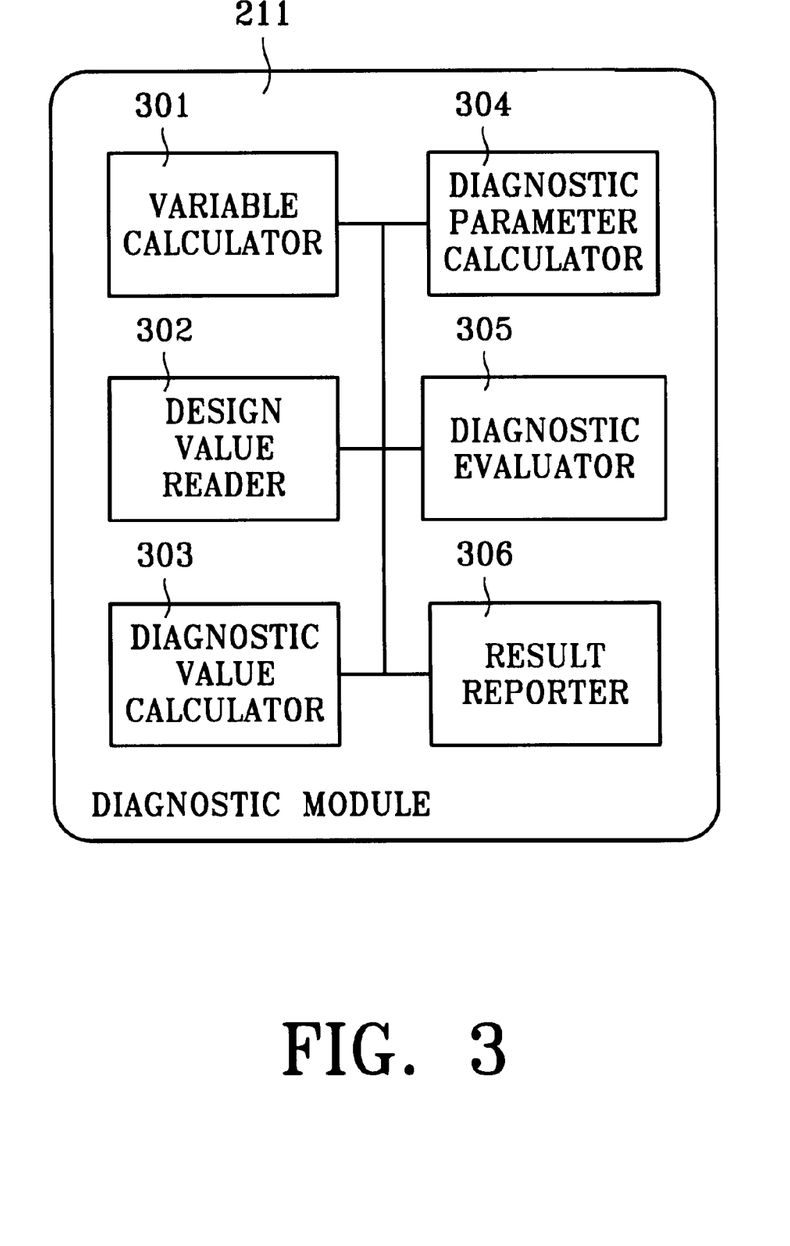
FIG. 3 is a flow diagram illustrating diagnostic steps according to an embodiment of the present invention.

Referring now to FIG. 3, diagnostic module 211 includes variable calculator 301, design value reader 302, diagnostic value calculator 303, diagnostic parameter calculator 304, diagnostic evaluator 305, and result reporter 306. The following describes generally the diagnostic steps performed by diagnostic module 211. A more detailed discussion of each step follows. When executed by microprocessor 210, diagnostic module 211 calculates amperage variables using the signal from amp sensor 203 processed by signal conditioner 207, and analog to digital converter 208. Diagnostic module 211 then reads design values for pump motor 201 stored in program data module 211 and calculates diagnostic values accordingly. Next diagnostic module 211 calculates diagnostic parameters and performs a diagnostic evaluation. Finally, diagnostic module 211 reports diagnostic results including amperage variables, diagnostic values, and diagnostic parameters to host 205.

Amperage Variables

Variable calculator 301 is responsible for calculating amperage variables. Amperage variables are quantities, derived from amperage signals obtained from amp sensor 203 that change value in the course of time in response to changing operating conditions of pump motor 201. The following are examples of amperage variables.

| | | | |
|---|---|---|---|
| I | = | Average stator amperage | (Amps) |
| W | = | Frequency of stator amperage | (Radians/Second) |
| D | = | Duration of stator amperage / cycle | (Minutes/Cycle) |
| D(Le) | = | Duration of amperage cycle of lead pump before lag pump starts in a cyclical system | (Minutes/Cycle) |
| D(La) | = | Duration of amperage cycle of lag pump in a cyclical system | (Minutes/Cycle) |
| T | = | The total time in which pumps are running during a given cycle; the duration of the longest amperage cycle chosen from D(Le) and D(La) after a multiple pump run | |
| B | = | Time duration between amperage cycles | (Minutes) |

The various durations of stator amperage (D, D(Le), D(La)) and time duration between amperage cycles (B) apply only in cyclically controlled pumping systems.

Design Values

Figure 5:
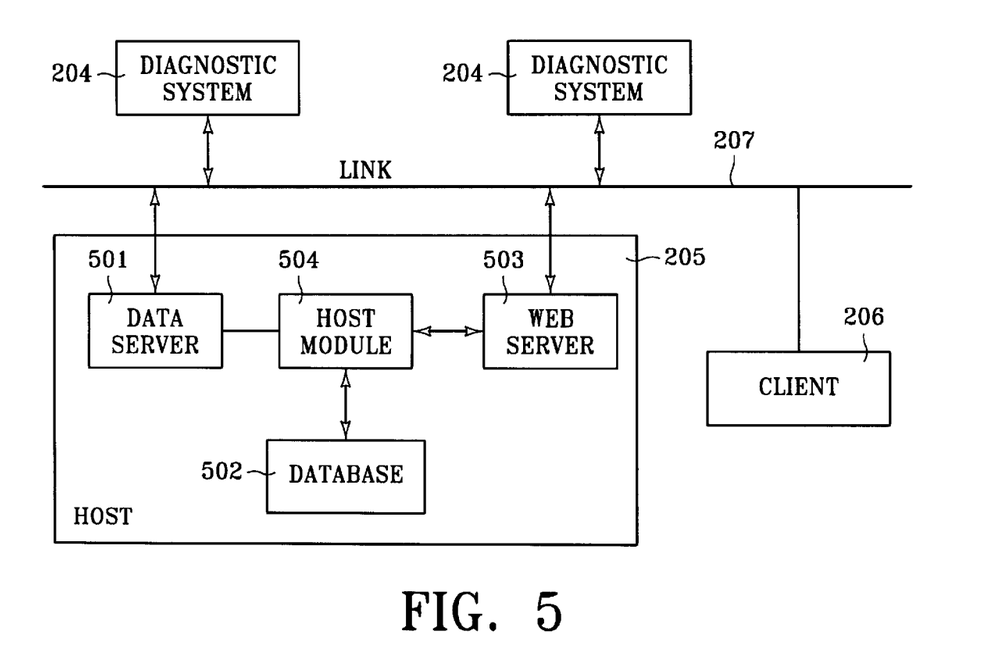
FIG. 5 is a schematic representation of a network in which various embodiments of the present invention may be incorporated.

Design value reader 302 is responsible for reading design values for pump motor 201 stored in program data module 212 and in database 502. Design values are predetermined quantities representing actual or estimated values of design constants such as:

| | | | |
|---|---|---|---|
| I(nl) | = | No load stator amperage | Amps |
| I(rated) | = | Rated stator amperage | Amps |

-continued

| | | | |
|---|---|---|---|
| W(rated) | = | Rated motor speed | Radians/Second |
| W(sync) | = | Motor synchronous speed @ rated power | Radians/Second |
| H(rated) | = | Rated pump head | Feet |
| Q(rated) | = | Rated pump flow @ rated speed & rated head | Cubic Feet/Second |
| E(m) | = | Minimum speed voltage | Volts |
| E(rated) | = | Rated motor voltage | Volts |
| V(w) | = | Total wet well volume | Cubic Feet |
| V(w1) | = | Volume of the wet well between the off level for all pumps and the start level for the lead pump. | Cubic Feet |
| V(w2) | = | Volume of the wet well between the start level of the lead pump and the start level of the lag pump. | Cubic Feet |
| P(f) | = | Rated motor power factor | Watts |
| C1 | = | Multiplication factor for lead pump duration when checking for pump failure versus high water condition | Percent Difference |
| C2 | = | Multiplication factor for lag pump duration for pump failure versus high water test | Percent Difference |

The program data module 212 is preferably a plug-in module. The design values listed above can be stored in the program data module 212 via a PC or laptop using a separate program data module programming device. The design values can also be stored in the program data module at the monitored site through a data port or via an Internet channel.

Diagnostic Values

Diagnostic value calculator 303 is responsible for calculating diagnostic values. Diagnostic values are variables that are derived directly or indirectly as functions of amperage variables. These values can be directly indicative of a problem or condition, or they can be intermediate values used in conjunction with other variables available in the system to calculate more significant diagnostic parameters. The table below lists a number of diagnostic values of the type needed for other formulas.

| | | | |
|---|---|---|---|
| R(Le) | = | The average volumetric throughput of the lead pump as measured over N time previous to the current pump cycle with 24 hours being typical | (Feet$^3$ / Sec) |
| AD | = | The average duration of an individual pump cycle as measured over the N time previous to the current pump cycle with 24 hours the norm | (Minutes) |
| AD(Le) | = | The average cycle time duration of the current lead pump over the past N time | (Minutes) |
| AD(La) | = | The average cycle time duration of the current lag pump over the past N time | (Minutes) |

It is expected that various embodiments of the present invention will help to minimize the number and cost of sensors required for diagnosis of pumping systems. As described above, the present invention derives a plurality of diagnostic values from a single amperage sensor input, whereas previously disclosed systems require multiple sensory inputs to derive equivalent diagnostic results. The formulas preferably used to calculate diagnostic values are described below.

The slip speed, W(s), of the electric motor that is used to drive the fluid pump can be calculated using the following formula:

$$W(s) = ((I^2 - I(nl)^2)/((I(\text{rated})^2 - I(nl)^2)/(W(\text{sync}) - W(\text{rated}))^2))^{1/2} \text{ (rad/sec)} \quad 2.1$$

Typically, squirrel cage induction motors are used in wastewater lift station pump applications. Slip speed is the difference between the frequency of the applied stator current and the rotational frequency of the rotor. Since the motor is rigidly attached to the pump, the pump speed can be calculated from the following formula:

$$W(m)=W-W(s) \text{ (rad/sec)} \qquad 2.2$$

W(m) is the speed of the motor, and, in the absence of a gear box, also represents the rotational speed of the pump.

Several formulas are used to calculate the flow rate from each pump depending on whether the pumping system control is fixed speed (i.e. cyclical) or variable speed.

In the case of a fixed speed system, the following formula yields an approximate flow rate for a pump cycle in the event that only a single pump runs during the cycle:

$$Q(\text{out})=(V(w1)+(Q(\text{in})*D(\text{Le})/60))/(D(\text{Le})/60) \text{ (feet}^3/\text{sec)} \qquad 2.3$$

Q(out) is the approximate discharge flow of a pump corresponding to a cycle, and Q(in) is the wet well inflow calculated by the following formula:

$$Q(\text{in})=V(w1)/B \text{ (feet}^3/\text{sec)} \qquad 2.4$$

Q(in) is calculated and stored immediately prior to each and every pump run period as soon as the value of B is known. B is the time duration between amperage cycles. Recalculating Q(in) so often greatly increases the overall accuracy of the wet well inflow and contributes to the accuracy of the other calculations. Formula 2.4 applies only to single pump cycles.

In the event that two pumps are running simultaneously in a cyclical system, the following formulas are used to calculate the approximate volumetric throughput of the two pumps in conjunction:

$$Q(\text{out Le})=((V(w)+(Q(\text{in})*T))*(D(\text{Le})/(D(\text{Le})+D(\text{La}))))/D(\text{Le}) \text{ (feet}^3/\text{sec)} \qquad 2.5$$

$$Q(\text{out La})=((V(w)+(Q(\text{in})*T))*(D(\text{La})/(D(\text{Le})+D(\text{La}))))/D(\text{La}) \text{ (feet}^3/\text{sec)} \qquad 2.6$$

These return volumetric throughput calculations proportionally balanced to the contribution of each pump in the multiple pump cycle.

The approximate inflow into the system during a multiple pump run is further refined at the point at which the second pump starts with the following equation:

$$Q(\text{in})=(V(w2)+(P(\text{Le})*D(\text{Le})))/D(\text{Le}) \text{ (feet}^3/\text{sec)} \qquad 2.7$$

The P(Le) value is derived by averaging the Q(out) values for the lead pump over N minutes, hours, or even days prior to the current pump cycle.

Simultaneous pump cycles in cyclical systems are often key indicators of system failure. The need for both pumps to run indicates either very high inflow into the system or that efficiency of the first of the two pumps has been impaired to the point that the first pump cannot handle the load. The difference between the two can be detected with some accuracy by comparing the length of D(Le) with the average of D(Le) as shown in the following Boolean equation:

$$\text{If } D(\text{Le})>(AD(\text{Le})+(AD*C1)) \text{ And } (D(\text{La}<=(AD+(AD*C2) \text{ And } D(\text{La})>=(AD-(AD*C2)) \qquad 2.8$$

Then Pump Failure Else High Inflow

This formula states that if the duration of the lead pump (D(Le)) is longer than the norm by a factor of C1 and the duration of the lag pump (D(La)) is near equal to the average duration of the pump cycles as limited by the factor C2, then the problem indicated by the multiple pump run event is likely a failure of the lead pump. If the above conditions are not true, the multiple pump run event is likely due to high inflow.

In the case of a variable speed pump, the following formula yields an approximate flow rate as a continuous function of time:

$$Q(\text{out})=Q(\text{rated})*W(m)/W(\text{rated}) \text{ (feet}^3/\text{sec)} \qquad 2.9$$

Q(rated) and W(rated) are design constants, and W(m) is the pump speed calculated using formula 2.2. Formula 2.9 can also be used to calculate flow rate from a cyclically operated fixed speed pump by integration of formula 2.2 over a predetermined time interval and dividing the result by the length of the time period. This operation yields an average pump speed that results from the pump running at a constant speed for time intervals of length D and being at zero speed for time intervals of length B.

At a given pump speed, head varies linearly with pump outflow. For centrifugal pumps typically used in wastewater pumping applications, head decreases as flow increases. Therefore, if speed and flow are known from formulas 2.2 and 2.9 respectively, the theoretical head may be calculated. However the actual head-flow relationship is influenced by reductions and losses in the pump and by the hydraulic conditions in the system. The most important head reduction results from the inability of the impeller blades to impart proper guidance to the fluid at the pump discharge. This is called circulatory flow, and is practically constant over the operating range of the pump. Fluid friction in flow through the moving and fixed passages of the pump causes losses that are proportional to the square of the flow. Another loss to consider is that of turbulence; the loss due to improper relative-velocity angle at the impeller blade inlet. In addition to the foregoing reduction and losses, pumps have torque losses due to bearing and packing friction and disk friction losses from fluid between the moving impeller and housing. Internal leakage is also an important power loss, in that fluid which has passed through the impeller, with its energy increased, escapes around clearances and flows back to the suction side of the impeller. Torque losses become particularly noticeable as the pump impeller wears or is damaged over time. Consequently, torque can be a significant diagnostic value in the detection of pump system degradation. Accordingly, the present invention provides a method of calculating torque by the following formula:

$$T(p)=(Q(\text{rated})*62.4*H(\text{rated})*W(s))/(W(\text{rated})*(W(\text{sync})-(\text{ft-lb}) W(\text{rated}))) \qquad 2.10$$

When the pumping system is operating properly, the total average inflow Q(in) will equal the total average outflow Q(out).

$$Q(\text{in})=\Sigma Q(\text{out}) \text{ (feet}^3/\text{sec)} \qquad 2.11$$

Q(out) is the output of each pump averaged over a predetermined period of time. The voltage supplied to the pump motor is a function of the frequency of the stator amperage in variable speed systems and may be calculated by the following formula:

$$E=((E(\text{rated})-E(m))*W/W(\text{rated}))+E(m) \text{ (volts)} \qquad 2.12$$

In the case of a fixed speed pumps, the stator voltage is typically a constant when the pump is running and zero otherwise. Formula 2.12 can also be used to calculate an equivalent supply voltage for a cyclically operated fixed speed pump by integration of W (frequency of stator amperage) over a predetermined time interval and dividing the result by the length of the time period. This operation yields an average pump voltage that results from the pump running at a constant voltage for time intervals of length D and being at zero voltage for time intervals of length B.

The power supplied to the system provides the energy required to produce the desired flow and overcome all of the losses in the electrical and hydraulic components of the pump system. The supply power is calculated by the following formula:

$$P = E * I * P(f)/1000 \text{ (kilowatts)} \qquad 2.13$$

In the case of cyclically operated fixed speed pumps, voltage (E) and amperage (I) must be averaged over a predetermined time period or number of cycles.

Diagnostic Parameters

Diagnostic parameter calculator 304 is responsible for calculating diagnostic parameters. Diagnostic parameters are quantities that, when compared with predetermined or previous quantities, indicate a particular type of fault or degradation in the pumping system (referred to in the present invention as an "adverse diagnosis"). The previous quantities to which the diagnostic parameters are compared can be either fixed diagnostic values stored in the program data module 212 or the database 502 or calculated diagnostic values derived from amperage variables and historical data. Some diagnostic parameters are listed below:

| | | |
|---|---|---|
| FQ(Le) | = The average of the leading-edge of the volumetric throughput of the lead pump filtered for aberrant values. The leading edge is defined by a discrete number of individual pump run events or the number of events which occur in N time prior to the diagnostic calculation. | (Feet$^3$ / Sec) |
| FQ(La) | = The average of the leading edge (as defined above) of the volumetric throughput of the lag pump with statistically unlikely values filtered out. | (Feet$^3$ / Sec) |
| FI(Le) | = The average of the leading edge of the amperage readings of the lead pump filtered for aberrant values. | (Amps) |
| FI(La) | = The average of the leading edge of the amperage values read from the lag pump filtered for outlying values. | (Amps) |
| FD(Le) | = The average duration of the leading edge of pump cycles as read from the lead pump. | (Minutes) |
| FD(La) | = The average duration of the leading edge set of pump cycles on the lag pump. | (Minutes) |
| FQ(in) | = The average of the leading edge of inflow calculations. | (Feet$^3$ / Sec) |

The following formula expresses the method of finding the leading-edge diagnostic parameters of the volumetric throughput where N is the count of pump events used. Similar formulas exist for computing all other leading-edge diagnostic parameters used by the system.

$$FQ(Le) = (\Sigma\ S(N\ Q(out\ Le)))/N \text{ (feet}^3\text{/sec)} \qquad 2.14$$

S is a filter function for limiting the values of Q(out Le) included in the summation as follows:

$$S(\ ) = \text{All } Q(out\ Le) \text{ in } N \text{ where } Q(out\ Le) > S1 \text{ And } Q(out\ Le) < S2 \qquad 2.15$$

The function S is used to filter out anomaly events such as occur when wastewater personnel manually switch pumps on and off for very short time periods. FQO and FQI also serve to smooth the data such that short-term variations in inflow, amperage, or outflow do not create diagnostic parameters which signal adverse diagnoses incorrectly.

The total energy consumed by the pumping system in any given time period can be calculated by integration of the supply power as described by the following formula:

$$U = \int P\ dt \text{ (kwh)} \qquad 2.16$$

Where the limits of integration extend over predetermined time periods. The volume pumped in corresponding time periods is calculated by the following formula.

$$V = \int Q \text{ (out) } dt \text{ (feet}^3\text{)} \qquad 2.17$$

Previously disclosed systems have suggested that the ratio of volume to energy may be used to derive diagnostic results. However, such systems require separate sensory inputs to determine the value of volume and energy, whereas the present invention derives both values from a single sensory input. Furthermore, the present invention derives torque from the same sensory input as volume and energy and combines torque with energy to produce an improved diagnostic analysis that is described below. Another diagnostic parameter that may be used in the diagnostic analysis of the present invention is the average torque calculated over a predetermined time period corresponding to the time period used to calculate the integrals of power and flow in formulas 2.16 and 2.17 respectively.

$$T = \int T(p)\ dt/T(d) \text{ (ft-lb)} \qquad 2.18$$

Where, T(p) is the torque calculated in formula 2.10 and T(d) is the length of a predetermined time period. Diagnostic parameter calculator 304 then is also responsible for calculating the baseline values or baseline pattern for each diagnostic parameter and recording the baseline value or pattern in program data module 212.

Additional diagnostic parameters may include the torque to energy ratio (TER) and the volume to energy ratio (VER). For example, as long as mechanical elements of the system maintain a constant condition, the TER and VER can be expected to remain fixed at a baseline value in the course of time. The baseline values can be calculated by averaging TER and VER over a period of time such that the average remains constant. The resulting baseline values can be stored in the program data module 305 or in the database at the host 205. In contrast, the volume pumped (V) can be expected to vary in the course of time in response to changes in the inflow conditions. However the pattern of variations can be expected to repeat periodically, since the sources of flow are usually fixed in number and reasonably predictable in the flow rate in the course of time. Therefore, a baseline pattern or trend can be established comprising a time series of expected values that repeat in a predetermined cycle (e.g. daily).

Diagnostic

Diagnostic evaluator 305 is responsible for performing diagnostic evaluations. To do so, diagnostic evaluator 305 compares current values of diagnostic parameters with baseline values and when differences occur, selects an adverse diagnosis from a correlation table. A correlation table is a matrix of possible combinations of differences between diagnostic parameters and their baseline values and a corresponding diagnosis. Theoretically, any deviation of a diagnostic parameter from its baseline value may be a cause for triggering an adverse diagnosis. As a practical matter however, a tolerance limit should be imposed. A tolerance limit permits deviations within specified bounds before an adverse diagnosis is issued. Such limits account for random fluctuations in sensor signals and operating conditions that do not represent an actual change in response to a fault. In the present invention, tolerance limits may have several different components. For most diagnostics, a magnitude component specifies the size of the deviation required to trigger an adverse diagnosis. For some, a range of stored data or pattern created from past stored data is used to compare to a current range or pattern. If the pattern differs by more than the magnitude component, an adverse diagnosis is indicated. For others, a frequency component specifies the number of sequential diagnostic evaluations that must be outside the size limit to trigger an adverse diagnosis.

Figure 4:
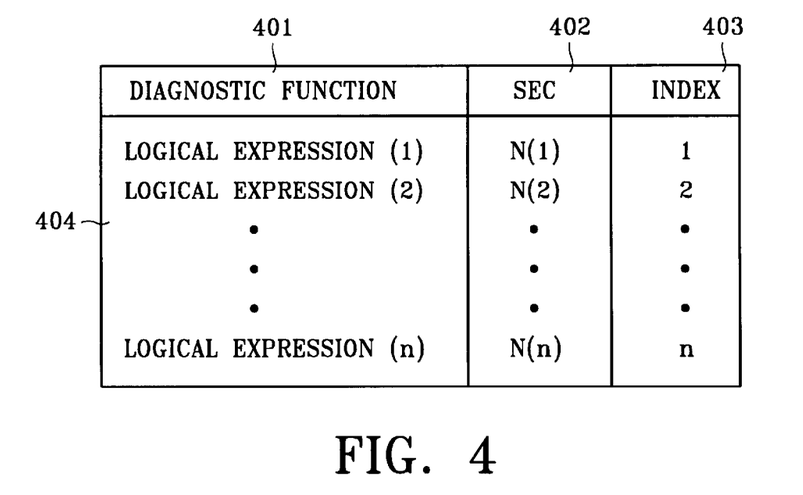
FIG. 4 is a flow diagram illustrating the initial resource access according to an embodiment of the present invention.

The present invention provides a means for the pump system operator to specify desired tolerance limits through an Internet resource. FIG. 4 shows an example of entries in a diagnostic correlation table. The column 401, labeled "Diagnostic Function" contains a list of functions of diagnostic parameter values, baseline values and tolerance limits. When all conditions for a listed diagnostic function are satisfied, an adverse diagnosis is triggered. The preferred Diagnostic Functions 401 for calculating some of the diagnoses follow:

Reductions in inflow over long periods can be determined by the following formulas:

$$FQ(\text{in}) = (\Sigma\ S(N\ Q(\text{in})))/N \text{ where } N = 1\text{--}7 \text{ Days (feet}^3/\text{sec})\quad 2.19$$

$$CQ(\text{in}) = (\Sigma\ S(N\ Q(\text{in})))/N \text{ where } N = 30 \text{ Days} + (\text{feet}^3/\text{sec})\quad 2.20$$

FQ(in) calculates the diagnostic parameter associated with low inflow. CQ(in) calculates the long term (30 day+) baseline to which FQ(in) is compared in the following formula to find whether or not a drop in inflow is significant.

$$\text{If } FQ(\text{in}) < (CQ(\text{in}) + (CQ(\text{in})^*C3)) \text{ Then Low Inflow}\quad 2.21$$

C3 is a diagnostic variable defined in the program data module 212. Comparisons over long periods are necessary because inflow in many wastewater lift stations can drop to zero or near zero for short periods without indicating a problem. Only when inflow drops consistently for a number of days is an adverse diagnostic report warranted.

Conditions in which pumps continue to run without pumping fluid after the wet well 102 is drained can be detected with the following diagnostic function:

$$\text{If } FD(\text{Le}) > (AD(\text{Le}) + (AD(\text{Le})^*C4)) \text{ And } FI(\text{Le}) < (AI(\text{Le}) - (AI(\text{Le})^*C5))\quad 2.2$$

Then Report Adverse Diagnostic

These conditions occur when the control system or level sensors in a lift station fail to correctly identify the wet well 102 as being drained. This leaves the pumps running for longer periods of time than usual as detected by the first portion of the Boolean expression listed above where C4 is the diagnostic variable bounding the required change. At the same time, the pumps are spinning without doing any work leading to reduced amperage demand. This condition is indicated by a true evaluation of the second half of the Boolean expression where C5 defines the amount the amperage must decline in order to generate an adverse diagnosis. The condition in which both halves of the Boolean expression evaluate to true is highly indicative of a pump running dry.

Fixed speed pumps in cyclical systems typically have a run pattern defined as the order in which each of the pumps is activated in relation to the other pumps in the system. The following diagnostic parameters define the operational pat terns of both a known correct system and the monitored systems current state.

| | |
|---|---|
| J = | Stored pump operational pattern such as J1, J2, J3, . . . JN where each value in the series contains the index number of a pump in the order in which the pumps were ran. |
| K = | Assembled actual operational pattern of a any number pumps compiled over a set block of time or a set count of pump run events such as K1,K2,K3, . . . KN where KN is the most recent pump event. |

The following formula detects changes to the operational state of the system by comparing the current operational pattern K to a stored, typical pattern J once for each pattern change identified in the system to a count of M pattern changes.

If Not $(J1=K1 \text{ And } J2=K2 \text{ And } J3=K3 \ldots \text{ And } JN=KN)$ Then If Not $(J2=K1 \text{ And } J3=K2 \text{ And } J4=K3 \ldots \text{ and } JN+1=KN)$ Then If Not $(JM=K1 \text{ And } JM+1=K2 \ldots \text{ And } JM+N-1=KN)$ Then $\quad 2.23$ Report Adverse Diagnostic If the first comparison fails, the comparison is recalculated comparing the captured pattern K to the stored pattern J starting with the second pattern change listed in J. This test continues to M pattern changes. If no match is found after M tests, an adverse diagnosis is generated indicating the pumps are operating outside of their proper pattern.

The following diagnostic function can be a logical expression 404 used to evaluate the torque-to-energy ratio and the volume-to-energy ratio such as:

$$\text{IF}((L(I,1) < (\text{TER-BL}(I,1)) < L(i,2)) \text{ AND } ((L(i,3) < (\text{VER-BL}(i,2))) < L(i,4)))\quad 2.24$$

TER and VER are diagnostic parameters, L(i,1), L(i,2), L(i,3) and L(i,4) are elements of an array of upper and lower tolerance limits for TER and VER, corresponding to the $i^{th}$ adverse diagnosis and BL(i,1) and BL(i,2) are elements of an array of baseline values for TER and VER respectively, corresponding to the $i^{th}$ adverse diagnosis. For example, the following list illustrates adverse diagnoses that can be identified by evaluating formula 2.24 with predetermined values from the L array, BL array, and current values of TER and VER.

| | |
|---|---|
| i = 1 | obstructed line |
| i = 2 | leak |
| i = 3 | dry pump |
| i = 4 | increased mechanical friction |
| i = 5 | impeller damage |

Reporting

Diagnostic reporter 306 is responsible for encoding and then reporting diagnostic results to host 205. FIG. 4 illustrates an example of a diagnostic correlation table 400 used by diagnostic reporter 306. The diagnostic function column 401 lists each logical expression used by diagnostic evaluator 305. The column 402 labeled "SEC" contains an entry or value corresponding to each logical expression in column 401. For instance, that value may represent the number of sequential evaluations of the corresponding logical expression that must evaluate to a "true" state before an adverse diagnosis is reported. In the simplest cases, column 402 may contain a magnitude value for a diagnostic parameter that when exceeded indicates an adverse diagnosis. In other cases, Column 402 may represent the pattern and the magnitude of the pattern values needed to indicate an adverse diagnosis. Since an initial diagnostic correlation table may not contain an exhaustive list of diagnostic functions and corresponding diagnoses, the present invention provides a method of expanding the table as additional problems that were not known initially are identified by practical experience over time. This method provides the present invention with an adaptive feature that facilitates improvement in the resolution capability of the diagnostics.

It is expected that the present invention will help to minimize the volume and frequency of communications required to deliver diagnoses to pump system operators and thus reduce the cost of the diagnostic system. This is accomplished in the present invention by limiting communications from diagnostic system 204 to reporting adverse diagnostic events and specific diagnostic variables important in providing supporting evidence for the adverse diagnostics generated by the system. Pump system operators often desire to have backup or detailed information about a specific adverse diagnosis. In such cases, the present invention provides a means of storing the time sequence of evaluations of diagnostic functions that yielded the adverse diagnosis and delivering said sequences to pump system operators upon demand. The present invention provides an additional means of storing a time history of specified diagnostic variables and parameters and delivering reports to pump system operators upon demand.

Host: Referring to FIG. 5, host 205 can receive diagnostic data from one or more diagnostic systems 204. Host 205 includes data server 501, database 502, web server 503, and host module 504. Data server 501 represents any programming capable of receiving diagnostic data from diagnostic systems. Web server 503 represents any programming capable of receiving and responding to requests for reports and displays from one or more pump system operators using one or more clients 206. Host module 504 represents generally any programming capable of decoding and storing diagnostic data received by data server 501, generating diagnostics from data stored in database 502, providing data in response to requests received by web server 503, and triggering diagnostic alerts.

Figure 6:
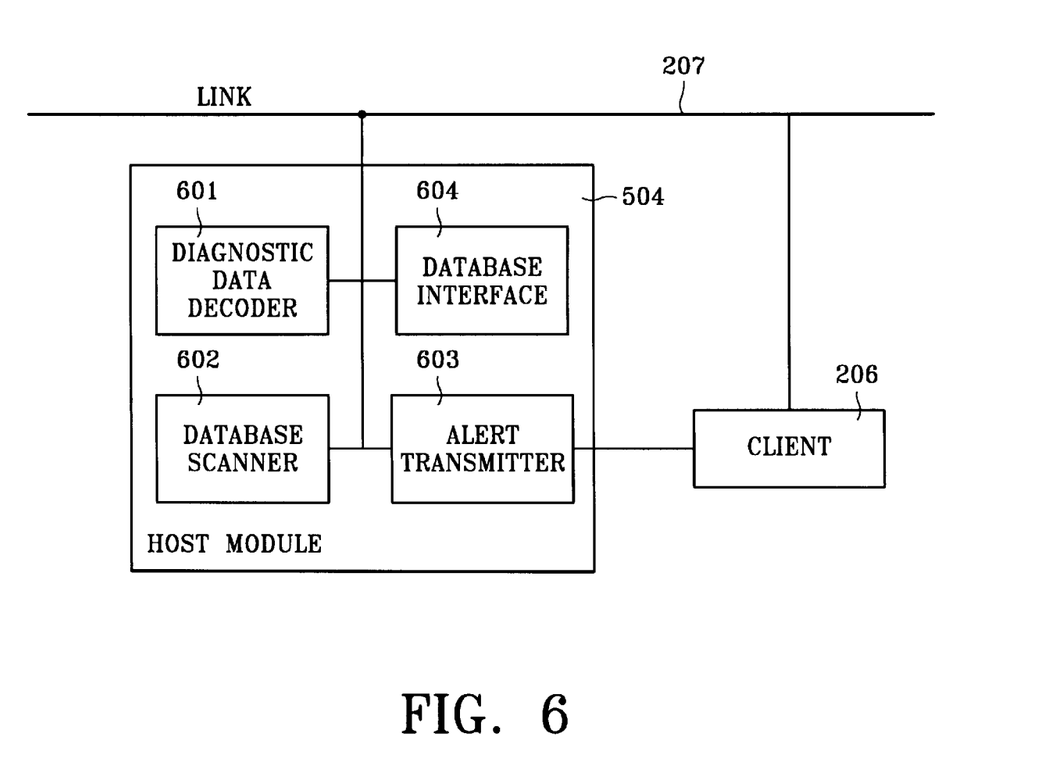
FIG. 6 is a block diagram of a host module according to an embodiment of the present invention.

Referring to FIG. 6, a host module includes diagnostic data decoder 601, database scanner 602, alert transmitter 603, and database interface 604. Diagnostic data decoder 601 decodes incoming messages from diagnostic systems 204 and stores the decoded messages in database 502. Database scanner 602 scans the database for adverse diagnosis events and triggers prescribed alerts. This program element matches the index number 403 with a detailed description of the adverse diagnosis that is also stored in database 502. Alert transmitter 603 communicates adverse diagnosis events to designated recipients. This may be accomplished by sending electronic mail over link 207 to a designated address associated with the diagnostic system 204 reporting the problem. It may also be accomplished by delivering a voice-synthesized adverse diagnosis message or a fax message to a designated telephone number. In response to requests received through web server 503, database interface 604 calculates displays of historical diagnostic data such as volume pumped hourly, daily, weekly, monthly or yearly as designated by a pump station operater through an interactive web page The present invention has been shown and described with reference to the foregoing exemplary embodiments. It is to be understood, however, that other forms, details, and embodiments may be made without departing from the spirit and scope of the invention, which is defined in the following claims

What is claimed is:

1. A pump motor diagnosis method, comprising:
    calculating amperage variables for a fixed speed cyclically controlled pump motor using a signal from an amp sensor measuring electrical current used by the pump, the amperage variables including an average stator amperage for the pump motor, a frequency of the stator amperage, a duration of the stator amperage, and a time duration between amperage cycles;
    acquiring pump motor design values;
    calculating diagnostic values using one or more calculated amperage variables and one or more of the acquired design values;
    calculating diagnostic parameters using one or more calculated diagnostic values; and
    performing a diagnostic evaluation comparing one or more diagnostic parameters with one or more baseline values or patterns.

2. The method of claim 1, wherein calculating diagnostic values comprises calculating a discharge flow produced by the pump motor.

3. The method of claim 2, wherein calculating diagnostic values comprises:
    calculating slip speed of the pump motor;
    calculating a speed of the pump motor;
    calculating an intake flow; and
    calculating the discharge flow produced by the pump motor using the calculated slip speed, motor speed, and intake flow.

4. The method of claim 1, wherein the individual discharge flow produced by more than one pump motor are each calculated proportionally during a pump cycle in which multiple pumps are running simultaneously.

5. The method of claim 1, wherein calculating diagnostic values comprises calculating a torque produced by the pump motor.

6. The method of claim 1, wherein calculating diagnostic values comprises calculating a voltage supplied to the pump motor.

7. The method of claim 1, wherein calculating diagnostic values comprises calculating power supplied to the pump motor.

8. The method of claim 1, wherein calculating diagnostic parameters comprises calculating the energy consumed by the pump motor over a predetermined period.

9. The method of claim 1, wherein calculating diagnostic parameters comprises calculating a volume pumped over a predetermined period.

10. The method of claim 1, wherein calculating diagnostic parameters comprises calculating an average torque produced by the pump motor over a predetermined period. A pump motor diagnosis method, comprising:
    calculating amperage variables for a pump motor using a signal from an amp sensor measuring electrical current used by the pump;
    acquiring pump motor design values;
    calculating diagnostic values using one or more calculated amperage variables and one or more of the acquired design values;
    calculating diagnostic parameters using one or more calculated diagnostic values;
    performing a diagnostic evaluation comparing one or more diagnostic parameters with one or more baseline values or patterns; and wherein the diagnostic parameters calculated are one or more parameters from a group of diagnostic parameters consisting of:
- an average torque produced by the pump motor over a predetermined period;
- a volume to energy ratio;
- a torque to energy ratio;
- a filtered, leading-edge average of pump cycle duration over a defined time period or pump cycle sample;
- a filtered, leading-edge average of pump stator amperage over a defined time period or pump cycle sample;
- a filtered, leading-edge average of wet well inflow over a defined time period or pump cycle sample;
- a filtered, leading-edge average of individual pump volumetric throughput over a defined time period or pump cycle sample; and
- a pump operational order.

11. The method of claim 1, further comprising calculating a baseline value by averaging a calculated diagnostic parameter over a period of time.

12. The method of claim 1, further comprising establishing a baseline pattern by recording a time series of expected values for a particular diagnostic parameter.

13. The method of claim 1, further comprising reporting an adverse diagnosis when a calculated a diagnostic parameter varies from a baseline value or pattern beyond a set tolerance limit.

14. A computer readable medium having instructions for:
- calculating amperage variables for a fixed speed cyclically controlled pump motor using a signal from an amp sensor measuring electrical current used by the pump, the amperage variables including an average stator amperage for the pump motor, a frequency of the stator amperage, a duration of the stator amperage, and a time duration between amperage cycles;
- acquiring pump motor design values;
- calculating diagnostic values using one or more calculated amperage variables and one or more of the acquired design values;
- calculating diagnostic parameters using one or more calculated diagnostic values; and
- performing a diagnostic evaluation comparing one or more diagnostic parameters with one or more baseline values or patterns.

15. The medium of claim 14, wherein the instructions for calculating diagnostic values comprise instructions for calculating a discharge flow produced by the pump motor.

16. The medium of claim 15, wherein the instructions for calculating diagnostic values comprise instructions for:
- calculating slip speed of the pump motor;
- calculating a speed of the pump motor;
- calculating an intake flow; and
- calculating the discharge flow produced by the pump motor using the calculated slip speed, motor speed, and intake flow.

17. The medium of claim 14, wherein the instructions for calculating diagnostic parameters comprise the instructions for calculating the individual discharge flow produced by more than one pump motor proportionally during a pump cycle in which multiple pumps are running simultaneously.

18. The medium of claim 14, wherein the instructions for calculating diagnostic values comprise instructions for calculating a torque produced by the pump motor.

19. The medium of claim 14, wherein the instructions for calculating diagnostic values comprise instructions for calculating a voltage supplied to the pump motor.

20. The medium of claim 14, wherein the instructions for calculating diagnostic values comprise instructions for calculating power supplied to the pump motor.

21. The medium of claim 14, wherein the instructions for calculating diagnostic parameters comprise instructions for calculating the energy consumed by the pump motor over a predetermined period.

22. The medium of claim 14, wherein instructions for calculating diagnostic parameters comprise instructions for calculating a volume pumped over a predetermined period.

23. The medium of claim 14, wherein the instructions for calculating diagnostic parameters comprise instructions for calculating an average torque produced by the pump motor over a predetermined period. A computer readable medium having instructions for:
- calculating amperage variables for a pump motor using a signal from an amp sensor measuring electrical current used by the pump motor;
- acquiring pump motor design values;
- calculating diagnostic values using one or more calculated amperage variables and one or more of the acquired design values;
- calculating diagnostic parameters using one or more calculated diagnostic values;
- performing a diagnostic evaluation comparing one or more diagnostic parameters with one or more baseline values or patterns; and
- wherein the diagnostic parameters calculated are one or more parameters from a group of diagnostic parameters consisting of:
  - an average torque produced by the pump motor over a predetermined period;
  - a volume to energy ratio;
  - a torque to energy ratio;
  - a filtered, leading-edge average of pump cycle duration over a defined time period or pump cycle sample;
  - a filtered, leading-edge average of pump stator amperage over a defined time period or pump cycle sample;
  - a filtered, leading-edge average of wet well inflow over a defined time period or pump cycle sample;
  - a filtered, leading-edge average of individual pump volumetric throughput over a defined time period or pump cycle sample; and
  - a pump operational order.

24. The medium of claim 14, having further instructions for calculating a baseline value by averaging a calculated diagnostic parameter over a period of time.

25. The medium of claim 14, having further instruction for establishing a baseline pattern by recording a time series of expected values for a particular diagnostic parameter.

26. The medium of claim 14, further having instructions for reporting an adverse diagnosis when a calculated a diagnostic parameter varies from a baseline value or pattern beyond a set tolerance limit.

* * * * *